(12) United States Patent
Kreuzeder

(10) Patent No.: US 8,496,093 B2
(45) Date of Patent: Jul. 30, 2013

(54) BRAKE PAD OF A DISC BRAKE

(75) Inventor: Robert Kreuzeder, Wurmannquick (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 352 days.

(21) Appl. No.: 12/760,965

(22) Filed: Apr. 15, 2010

(65) Prior Publication Data

US 2010/0258384 A1 Oct. 14, 2010

Related U.S. Application Data

(63) Continuation of application No. PCT/EP2008/008542, filed on Oct. 9, 2008.

(30) Foreign Application Priority Data

Oct. 18, 2007 (DE) .......................... 10 2007 049 981

(51) Int. Cl.
*F16D 65/40* (2006.01)

(52) U.S. Cl.
USPC ............... 188/73.38; 188/1.11 L; 188/1.11 W

(58) Field of Classification Search
USPC .............. 188/1.11 L, 1.11 R, 1.11 W, 1.11 E, 188/73.38; 340/453, 454; 192/30 W; 116/208
See application file for complete search history.

(56) References Cited

U.S. PATENT DOCUMENTS

| | | | | |
|---|---|---|---|---|
| 3,783,979 A | * | 1/1974 | Hess | 188/1.11 R |
| 4,742,326 A | * | 5/1988 | Gregoire et al. | 340/453 |
| 6,932,199 B2 | * | 8/2005 | Emmett et al. | 188/250 B |
| 8,016,084 B2 | * | 9/2011 | Camilo-Martinez et al. | 188/73.38 |
| 2003/0010582 A1 | * | 1/2003 | Denton et al. | 188/73.38 |
| 2009/0020380 A1 | | 1/2009 | Camilo-Martinez et al. | |
| 2009/0211857 A1 | * | 8/2009 | Camilo-Martinez et al. | 188/250 B |

FOREIGN PATENT DOCUMENTS

| | | | |
|---|---|---|---|
| DE | 103 31 734 A1 | 2/2005 | |
| DE | 10 2005 055 188 A1 | 5/2007 | |
| DE | 10 2006 034 764 A1 | 6/2007 | |
| EP | 475335 A1 * | 3/1992 | 188/1.11 R |
| EP | 558406 A1 * | 9/1993 | 188/1.11 R |
| EP | 1 496 283 A1 | 1/2005 | |
| WO | WO 2007/051615 A1 | 5/2007 | |
| WO | WO 2007/068464 A1 | 6/2007 | |

OTHER PUBLICATIONS

German Office Action dated May 14, 2008 including English-language translation (Seven (7) pages).
International Search Report dated Feb. 16, 2009 including English-language translation (Four (4) pages).

* cited by examiner

*Primary Examiner* — Robert A Siconolfi
*Assistant Examiner* — Mariano Sy
(74) *Attorney, Agent, or Firm* — Crowell & Moring LLP

(57) ABSTRACT

A brake pad of a disc brake is provided, in particular for a commercial vehicle. A pad carrier plate supports a friction lining. A pad-retaining spring, which is movable relative to the pad carrier plate in the clamping direction, is nonreleasably connected by a hood fastened on the pad-retaining spring. An electric final wear indicator is attached with a sensor fitted on the edge of the pad carrier plate. The sensor is retained captively in the fitted position of the brake pad by the pad-retaining spring. The brake pad is designed such that the distance of the fitted pad-retaining spring from the pad carrier plate in the relaxed or substantially relaxed position of the pad-retaining spring in the region of the sensor is the same size as or larger than the associated dimension size of the sensor.

12 Claims, 2 Drawing Sheets

BRAKE PAD OF A DISC BRAKE

CROSS-REFERENCE TO RELATED APPLICATIONS

This application is a continuation of PCT International Application No. PCT/EP2008/008542, filed Oct. 9, 2008, which claims priority under 35 U.S.C. §119 from German Patent Application No. DE 10 2007 049 981.9, filed Oct. 18, 2007, the entire disclosures of which are herein expressly incorporated by reference.

BACKGROUND AND SUMMARY OF THE INVENTION

The invention relates to a brake pad of a disc brake.

As is known, the friction pads of brake pads are subject to operation-induced wear which is monitored for reasons of operational safety, with the result that the brake pad can be replaced at the latest when a minimum thickness of the friction pad has been reached.

In order to monitor the wear of the friction pad, an electrical wear end indicator is used. The electrical wear end indicator has a sensor which is inserted on the edge side into the pad carrier plate of the brake pad and is connected via electrical cables to an evaluation unit.

DE 10 2006 034 764 A1 discloses and describes a brake pad of the generic type, which is equipped with a pad-retaining spring supported on an outer edge region of the pad carrier plate and which is connected nonreleasably to the pad carrier plate by means of a hood or cover.

In the mounted functional position of the brake pad, that is to say when it is installed in a disc brake, a retaining clamp or bar, which is clamped with a brake caliper of the disc brake is supported on the pad-retaining spring and/or on the hood. The brake pad is pressed under spring prestress into a pad carrier support of a vehicle-side brake carrier.

The above-mentioned sensor of the wear end indicator is held captively by the pad-retaining spring, since the pad-retaining spring is positioned in such a way that the displacement travel, that is to say the insertion travel, of the sensor is limited correspondingly.

Usually, brake pads of the concerned type have up to now been preassembled, that is to say including the wear end indicator. Here, the sensor is also secured against loss by the pad-retaining spring in the not yet mounted position of the brake pad. However, this results in some disadvantages, since mounting and dismantling of the sensor is no longer possible when the cover is already inserted and connected to the pad carrier plate. This has the consequence that it is not possible to replace the sensor in the installed position of the brake pad, for example if the sensor is defective, with the result that the entire brake pad has to be replaced.

In addition, correspondingly extensive stockpiling of brake pad sets is required since, as mentioned, the brake pads are preassembled completely on account of the nonreleasable fastening of the pad-retaining spring to the pad carrier plate.

The invention is therefore based on the object of developing a brake pad of the above-described type in such a way that it can be produced and mounted more simply and cheaply.

This object is achieved by a brake pad of a disc brake, in particular for a commercial vehicle, having a pad carrier plate which carries a friction pad and to which a pad-retaining spring, which can be moved in the clamping direction relative to it, is connected nonreleasably by means of a hood fastened thereto. An electrical wear end indicator is connected with a sensor which is inserted on the edge side. The sensor is held captively in the mounted position of the brake pad by the pad-retaining spring, which is pressed down by way of a pad-retaining clamp. When the pad-retaining clamp is dismantled and therefore in a relieved or largely relieved position of the pad-retaining spring, the spacing of the mounted pad-retaining spring from the pad carrier plate in the region of the sensor is equal to or greater than the associated height dimension of the sensor.

As a result of this design embodiment, there is the possibility to mount the wear end indicator and/or its sensor even if the pad-retaining spring has already been connected nonreleasably to the pad carrier plate. This affords considerable advantages over the prior art. Thus, for example, it is possible to replace the sensor if the latter is defective, without it being necessary to change the entire brake pad. Naturally, there is a certainly remarkable cost saving as a result, provided that the brake pad is otherwise still functional, that is to say the friction pad is not yet worn out correspondingly.

In order to replace the sensor in an installed brake pad, only the pad-retaining clamp which is supported on the pad-retaining spring, is to be released, with the result that the pad-retaining springs are relieved and the sensor can be pushed into the intermediate space formed between the pad-retaining spring and that edge of the pad carrier plate which is assigned to the pad-retaining spring and can subsequently be removed.

However, not only is the replacement of a sensor possible without problems as a result of the invention, but rather also the retrofitting of the brake pad which is in this respect preassembled as a structural unit and in which the pad-retaining spring has already been connected nonreleasably to the pad carrier plate and the friction pad is fastened thereto. These preassembled brake pads can then be equipped with the sensor only when required. This results in cost-reducing simplified stockpiling, and also flexible, tailored equipping of the brake pad.

There is provision according to one advantageous embodiment of the invention for the spacing of the mounted pad-retaining spring from the pad carrier plate in the relieved or largely relieved position, which spacing is equal to or greater than the associated height dimension of the sensor, to be fixed by mutually corresponding stops of the pad carrier plate on one side and the hood or cover on the other side.

Here, the hood or cover is connected to the pad carrier plate in a radially displaceable manner. A slot can be provided, for example, in the hood or cover as a stop, in which slot a pin of the pad carrier plate is guided, the slot extending in the clamping direction of the pad-retaining spring.

However, one or more grooves may be provided in the pad carrier plate, which grooves likewise extend in the clamping direction of the pad-retaining spring and into which projections of the hood or cover engage.

Further advantageous embodiments of the invention are described herein.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
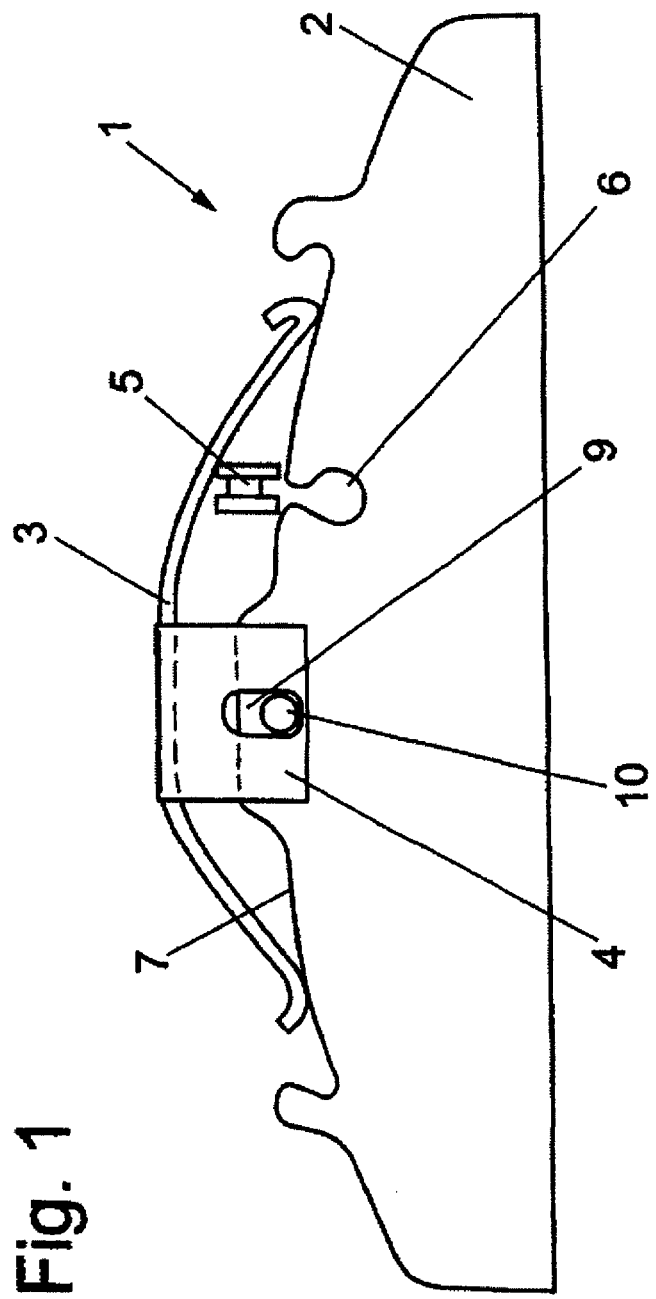
FIG. 1 shows a brake pad according to an embodiment of the invention in the position of non-use, in a rear view.

The figures show a brake pad of a disc brake, in particular for a commercial vehicle, which brake pad is provided overall with the designation 1 and has a pad carrier plate 2 which carries, on its front side (brake disc side, not shown in the figures), a friction pad which, in the functional case, makes contact with the brake disc of the disc brake.

An arcuate-shaped pad-retaining spring 3, which can be moved in the clamping direction relative to the pad carrier plate 2, is fastened nonreleasably to the pad carrier plate 2, to which end a hood or cover 4, which is fastened to the pad carrier plate 2 in a radially movable manner, is connected to the pad-retaining spring 3.

In the present exemplary embodiment, a slot 9, in which a pin 10 of the pad carrier plate 2 is guided, is provided in the hood or cover 4 for fastening purposes.

Starting from that edge 7 of the pad carrier plate 2 which faces the pad-retaining spring 3 and on which the pad-retaining spring 3 is supported, a recess 6, which is open toward the edge 7, extends into the pad carrier plate 2 and serves to receive a sensor 5 of a wear end indicator.

The spacing of the pad carrier plate 2 from the pad-retaining spring 3, which is fastened to the pad carrier plate 2, in the relieved or largely relieved position, as shown in FIG. 1, in the region of the sensor 5 is equal to or greater than the associated height dimension of the sensor 5.

As a result, for mounting and/or dismantling, the sensor 5 can be inserted into the intermediate space which is formed between the pad-retaining spring 3 and the pad carrier plate 2, and can be guided into the recess 6 or removed from it.

Figure 2:
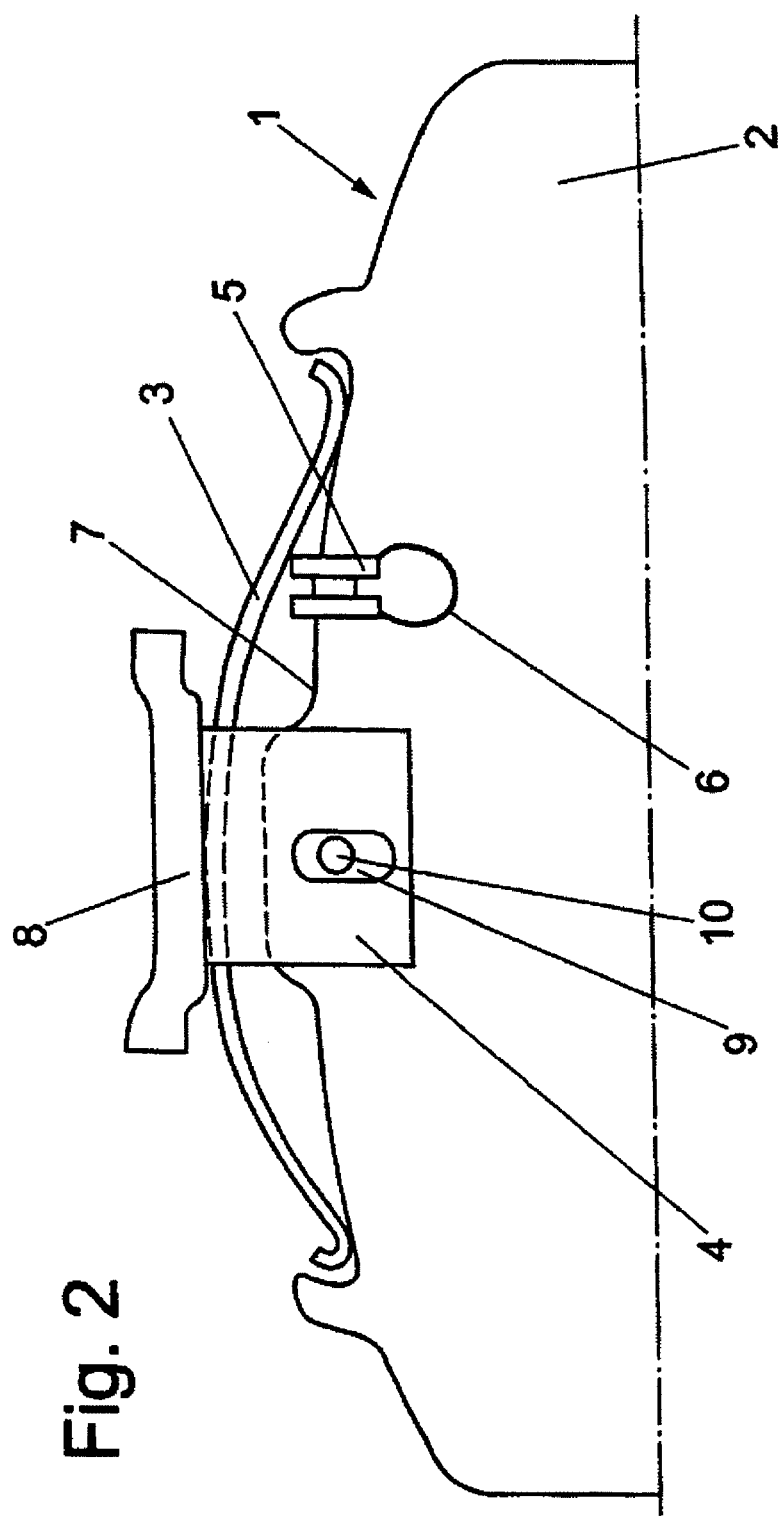
FIG. 2 shows the brake pad according to FIG. 1 in a use position, likewise in a rear view.

FIG. 2 shows the brake pad 1 in a functional position which is inserted into the disc brake and in which a pad-retaining clamp or bar 8 is supported on the pad-retaining spring 3 and/or the hood/cover 4. The pad-retaining clamp 8 is otherwise fixed to a brake caliper (not shown) of the disc brake and presses the brake lining 1 into a pad shaft of a brake carrier, with clamping of the pad-retaining spring 3.

In this position, the pad-retaining spring 3 is deformed in the direction of the pad carrier plate 2 and the edge 7 in such a way that the spacing between the edge 7 and the pad-retaining spring 3 in the region of the sensor 5 is smaller than the associated height dimension of the sensor 5, with the result that the latter is held captively in the pad carrier plate 2.

The maximum spacing between the pad carrier plate 2 and the pad-retaining spring 3 is defined in the example by the possible displacement travel of the pin 10 in the slot 9, which displacement travel accordingly has to be at least as great as the maximum spacing between the pad carrier plate 2 and the pad-retaining spring 3.

TABLE OF REFERENCE NUMERALS

1 Brake pad
2 Pad carrier plate
3 Pad-retaining spring
4 Cover (hood)
5 Sensor
6 Recess
7 Edge
8 Pad-retaining clamp or bar
9 Slot
10 Pin The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad of a disc brake having a pad-retaining clamp supported by a caliper, the brake pad comprising:
   a pad carrier plate carrying a friction pad;
   a pad-retaining spring connected non-releasably by a cover to the pad carrier plate, the pad-retaining spring being movable in a clamping direction relative to the pad carrier plate; and
   a sensor of an electrical wear end indicator fitted at an edge side of the pad carrier plate, the sensor being held captively in a mounted position of the brake pad by the pad-retaining spring when the pad-retaining spring is deformed toward the pad carrier plate by the pad-retaining clamp;
   wherein in a deformed position of the pad-retaining spring, a spacing between the pad-retaining spring and the pad carrier plate in a region of the sensor is smaller than an associated height dimension of the sensor; and
   wherein in a substantially relieved position of the pad-retaining spring, the spacing between the pad-retaining spring and the pad carrier plate in the region of the sensor is equal to or greater than the associated height dimension of the sensor.

2. The brake pad according to claim 1, wherein the spacing is defined by mutually corresponding stops of the cover and the pad carrier plate.

3. The brake pad according to claim 2, wherein the mutually corresponding stops of the cover and the pad carrier plate are configured as a slot provided in one of the cover and pad carrier plate extending in a clamping direction of the pad-retaining spring, an associated pin of the corresponding cover or pad carrier plate is guided in the slot.

4. The brake pad according to claim 1, wherein the sensor is fitted in a recess provided in the pad carrier plate.

5. The brake pad according to claim 4, wherein the recess is in a region of the edge side of the pad carrier plate facing the pad-retaining spring.

6. The brake pad according to claim 5, wherein the recess is open at the edge side of the pad carrier plate.

7. The brake pad according to claim 2, wherein the sensor is fitted in a recess provided in the pad carrier plate.

8. The brake pad according to claim 7, wherein the recess is in a region of the edge side of the pad carrier plate facing the pad-retaining spring.

9. The brake pad according to claim 8, wherein the recess is open at the edge side of the pad carrier plate.

10. The brake pad according to claim 1, wherein the sensor is insertable into the spacing.

11. The brake pad according to claim 4, wherein the sensor is guidable into the recess and removable from the recess.

12. The brake pad according to claim 7, wherein the sensor is guidable into the recess and removable from the recess.

\* \* \* \* \*